Patented Jan. 9, 1940

2,186,132

UNITED STATES PATENT OFFICE 2,186,132

SULPHONATED TERPENYL ALKYL PHENOLS

Robert Zink, Bridgeville, Pa., assignor to American Cyanamid & Chemical Corp., New York, N. Y., a corporation of Delaware No Drawing. Application June 26, 1937,
Serial No. 150,542

7 Claims. (Cl. 260—512)

This invention relates to sulphonated condensation products of terpenes with alkyl phenols, and more particularly to condensation products of this type in which the phenol or phenolic group contains at least one alkyl group having three or more carbon atoms. The invention includes both the novel condensation products, which are powerful wetting, scrubbing and emulsifying agents, and the various methods hereinafter described by which these new products may be prepared.

I have found a new class of sulphonated condensation products of terpenes with alkyl phenols in which the phenolic group contains at least one alkyl group having three or more carbon atoms which are unusually powerful wetting, scrubbing and emulsifying agents, both in substantially neutral aqueous solutions and in those containing unusually large amounts of acids and alkalies. The remarkable wetting properties of these new compounds are most unexpected in view of the fact that the corresponding condensation products of cresols, which are known, have only slight wetting powers.

My new sulphonated condensation products may be prepared by condensing terpenes and their derivatives such as pinene, dipentene, terpinolene, carene, sylvestrene, terpinene, pine oil, terpinels and the like with sulphonated alkyl phenols, which are easily prepared by reacting upon the alkyl phenol with sulphuric acid monohydrate at temperatures of 110–130° C., or by the use of fuming sulphuric acid at correspondingly lower temperatures. Another method which may be employed is the reaction of higher alkyl chlorides such as butyl or amyl chloride with the sulphonated terpenyl phenol. Still another method is the condensation of the higher alkyl chloride with the unsulphonated terpenyl phenol, followed by sulphonation. I prefer, however, for reasons which will become apparent, to condense the higher alkyl phenols with terpenes preferably in the presence of condensation catalysts such as paratoluene sulphonic acid, sulphuric acid, chlorsulphonic acid or oleum or aluminum chloride, and then to sulphonate the condensation products to the stage in which they are water soluble. The reaction mixture is then preferably neutralized with alkali and used in the form of its alkali metal salts, but other bases such as ammonium, ethanolamine, alkaloids, etc. may also be used.

I have not as yet definitely determined the reason why my new condensation products of higher alkyl substituted phenols possess such tremendously improved wetting properties as compared with those prepared from the lower alkyl phenols such as cresol. I am at present of the opinion that the terpenyl group which is introduced by the condensation is not in itself sufficient to give the sulphonated condensation product the requisite oil solubility for a satisfactory wetting agent, and the same is true of such as propyl or isopropyl phenol, butyl, isothe methyl or ethyl groups which substitute the phenol nucleus in the lower alkyl phenols. The use of higher alkyl phenols, on the other hand, butyl, and particularly paratertiary butyl phenol and amyl, isoamyl and paratertiary amyl phenols as well as the hexyl, heptyl and octyl phenols will provide the necessary additional carbon atoms to form a correct balance with the water-soluble sulphonic acid group or groups of the completed wetting agents, and it is an advantage of the invention that these alkyl groups can be so chosen as to provide exactly the proper balance between hydrophile and hydrophobe groups for a wetting agent for any given purpose.

My new sulphonated condensation products may be prepared in the form of pure chemical compounds, but I have found that this is not necessary in most cases to obtain products of high wetting and emulsifying properties. If isolation of the pure products is desired, it can be accomplished by fractionating the mixture of higher alkyl phenol-terpene condensation products followed by separate sulphonation of the pure fractions.

In condensing the terpenes with the higher alkyl phenols such as p-tertiary butyl phenol or p-tertiary amyl phenol, I have found that mixtures of two different types of products are obtained. In one type of condensation product, the terpene appears to couple directly to the nucleus of the phenol; in other words, there is a carbon to carbon linkage. In the other type, there is an ether formation between the oxygen of the phenol and the terpene so that no phenolic group is present as such in the final product. When the condensation is carried out at lower temperatures, such as 1–35° C. with the use of larger amounts of relatively mild condensation catalysts, such as sulphuric acid, and particularly with the use of excess terpene, the condensation products containing the carbon linkage will predominate. When the condensation is carried out at higher temperatures of 100–160° C., using smaller amounts of catalyst, the compounds containing the ether linkage will predominate. Inasmuch as both classes of compounds possess about the same properties and have substantially the same wetting and emulsifying powers, I make no distinction in the following claims between the two types and both are included in the invention.

My invention will be more specifically described by the following specific examples, to which, however, it is not limited.

Example 1

Propyl or isopropyl phenol is dissolved in carbon tetrachloride, 10% of its weight of concentrated sulphuric acid is added as catalyst, and an equimolecular amount of alpha pinene is slowly added with continuous stirring over a period of 2 hours. The condensation is continued at 30° C. for about 24 hours, or until reaction is complete. The solvent is then removed by distillation.

145 parts of the above condensation product is heated to 60-90° C. and 93 parts concentrated sulphuric acid are added with stirring at this temperature during a period of one hour. The agitation is continued at the same temperature for an additional 3½-5 hours, or until samples show complete solubility in water, after which the product is neutralized with a sodium hydroxide solution. In this form it shows good wetting properties, even though it contains considerable organic impurities and a relatively high percentage of sodium sulphate. To obtain a purer product having better properties the neutralized sulphonate is dried, ground, and extracted with ethyl alcohol.

The purified mass is a light brown solid both soluble and stable in water, alkalies and acids, and possessing good wetting properties. It is also useful in the preparation of emulsions of the oil-in-water type, and in breaking emulsions of the water-in-oil type. When condensed with formaldehyde at 105-120° C., using ammonia as a catalyst, its emulsifying and demulsifying properties are improved.

Example 2

Equimolecular proportions of p-tertiary butyl phenol and alpha or beta pinene are condensed as in Example 1, using carbon tetrachloride as solvent. The product, containing the carbon tetrachloride, is treated at 0-5° C. with the theoretical amount of chlorsulphonic acid to produce the monosulphonate for a period of 6-8 hours until a water-soluble product is obtained. The carbon tetrachloride is then removed and the product neutralized with sodium hydroxide solution, dried, and extracted with ethyl alcohol. It is a light brown powder which is soluble in water, acids and alkalies and possesses excellent stability and wetting properties.

A comparison of the above product at 30° C. with the sodium salt of sulphonated terpenyl cresylic acid by the Draves sinking test shows its remarkable superiority as a wetting agent. In concentrations of 10, 8, 5 and 4 grams per liter of water the cresylic acid condensation product gave sinking times in seconds of 24.0, 35.6, 50.3 and 66.9. Under the same conditions, concentrations of 2.0, 1.25, 1.0 and 0.8 grams per liter of the butyl phenol condensation product gave sinking times of 9.9, 22.6, 34.2 and 48.1 seconds. This shows that only about one-eighth of the butyl phenol condensation product is required to supply the same wetting properties to a solution as compared with the known cresol condensation product. This remarkable improvement in wetting properties makes the butyl phenol condensation product, and in fact all the higher alkyl phenol compounds ideally well suited for alkaline scouring baths for wool, cotton, rayon, etc.

as well as any other application in the textile industry where their resistance to alkali is of advantage. Similarly their stability and wetting properties in the presence of acids makes them well suited for use in the removal of arsenic and other spray residues from apples, citrus fruit and the like by solutions of hydrochloric acid, sulphuric acid and similar acid treating baths.

Example 3

164 parts of p-tertiary amyl phenol are dissolved in carbon tetrachloride and 19 parts of concentrated sulphuric acid are gradually added while maintaining the temperature at 25-30° C. When all the sulphuric acid is in, the mixture is heated to 130° C., the heat is turned off, and 136 parts of alpha or beta pinene is added at a rate which will maintain the temperature at 125-130° C. The product is permitted to stand for 24 hours, or until the reaction is complete.

The resulting terpenyl amyl phenol is sulphonated by introducing the theoretical amount of chlorsulphonic acid or 27% oleum, which should be cooled to 0-5° C., after adding more carbon tetrachloride solvent if necessary. The sulphonating agent is preferably added with stirring over a period of 1½ hours, after which the stirring is continued until the reaction is complete. When oleum is used, the original low temperature of 0-5° C. should be maintained during the entire reaction time of about 4 hours, but with chlorsulphonic acid the mixture may be held at room temperature after the addition of acid is complete. This reagent, however, requires 20-24 hours to complete the reaction to the point where a water-soluble product is obtained.

The product is neutralized with sodium or potassium hydroxide solution, dried and ground. If desired the organic material may be extracted from the sodium or potassium sulphate with ethyl alcohol, but for the production of a commercial wetting agent or detergent this is not usually necessary. On the contrary the dried, granular product obtained from the neutralization has excellent wetting and detergent properties, and forms one of the novel features of the present invention. It constitutes a light tan powder, consisting of about 50% sodium or potassium sulphate and the remainder terpenyl amyl phenol sulphonate (in the form of its sodium or potassium salt) which is both soluble and stable in water and in aqueous solutions containing alkalies or acids. It is excellently suited for use in scouring baths for raw wool, as an assistant in kier boiling, in the finishing of wool, cotton and rayon fabrics, in delustering cellulose acetate yarns and fabrics, and generally in the textile industry wherever a wetting agent of good calcium tolerance and stable against alkalies and acids is needed.

Example 4

Higher alkyl phenols may be readily prepared by reacting unsaturated aliphatic hydrocarbons with phenols, cresols, xylols, etc. in the presence of metal chlorides such as aluminum chloride, zinc chloride or ferric chloride, using carbon tetrachloride as solvent. Preferably a small quantity of the corresponding chloride of the aliphatic hydrocarbon is also present, and the reaction is carried out at 60-80° C. as described in U. S. Patent No. 1,892,990. Instead of pure aliphatic hydrocarbons, mixtures such as those found in cracked gasolines may be used, particularly those prepared by pressure cracking processes and containing substantial amounts of unsaturated hydrocarbons of 6 to 12 carbon atoms. If desired, these products may be separated by fractionation, or mixtures of two or more of the pure compounds may be used.

For example, hexyl or octyl phenol obtained in the above manner may be condensed with terpenes such as alpha or beta pinene, or with dipentine or terpinene as described in the preceding examples, using carbon tetrachloride as solvent and 1% by weight of sulphuric or chlorsulphonic acid as catalyst. The product is preferably sulphonated with a slight excess of oleum at low temperatures or with sulphuric acid at 80° C. as described in Example 3, followed by neutralizing with sodium or ammonium hydroxide solution. Instead of these, other bases such as triethanolamine or other alkylolamines, pyridine, alkaloids, etc. may be used to vary the physical characteristics of the product. For example the ammonium salts after drying and extracting with alcohol are light tan powders, soluble in water, acids and alkalies, and well suited for use as emulsifying or demulsifying agents in the preparation or breaking of mineral oil emulsions. To produce a compound especially suited for this purpose, the free sulphonic acid before neutralization may be reacted with hydrophobe compounds containing free hydroxy groups, such as castor oil, ricinoleic acid and the like. Similarly, the product resulting from condensation with formaldehyde as described in Example 1 may be used for this purpose.

Example 5

164 parts of isoamyl phenol are melted and 6 parts of p-toluene sulfonic acid or camphor sulphonic acid are added. The mixture is heated to 120–130° C. and 136 parts of alpha pinene, terpinene, terpinolene, dipentene or a mixture of these is slowly added at a rate which will maintain the temperature substantially constant. The mixture is then heated at 150° C. for 6–8 hours, or until the condensation is complete.

The product will be substantially the same irrespective of which of the above terpenes or terpene mixtures are used, for the groups will undergo rearrangement during the reaction.

The product may be sulphonated at low temperatures in the presence of a solvent such as carbon tetrachloride with sulphuric acid or oleum. At higher temperatures the terpenyl amyl phenol ether becomes thin enough to be agitated, and the sulphonation can be accomplished without the use of a solvent at temperatures of 85–100° C. Perhaps the best conditions are found at about 60° C., where only a relatively small amount of solvent is necessary but where a 200–300% excess of sulphuric acid may be used with safety and with a marked shortening of the sulphonation time.

The stability and wetting properties of the products obtained by this example are shown by the following tests. Paratertiary amyl phenol is condensed with alpha pinene under the above described conditions, using 2% of p-toluene sulfonic acid as catalyst and a reaction temperature of 150° C. An analysis for phenolic groups by adding methyl magnesium iodide (Grignard reagent) in dry butyl ether and measuring the volume of methane evolved showed that the product consisted predominately of phenol ethers, less than 15% of compounds containing free phenolic groups being found. Representative samples were sulphonated as follows:

| | Terpenyl amyl phenol ether | Sulphonation agent | Solvent | Acid added | | Sulphonation | | Water solubility |
|---|---|---|---|---|---|---|---|---|
| | | | | Temp. | Time | Temp. | Time | |
| | | | | °C. | Hours | °C. | Hours | |
| A | 75 g.=0.25 mol | Chlorsulphonic acid, 30.5 grs | CCl₄ 75 cc | 0–5 | 1½ | 15 | 20 | Clearly sol. |
| B | do | Oleum, 27.1% 74 grs | do | 0–5 | 1½ | 0–5 | 4 | Do. |
| C | 150 g.=0.5 mol | H₂SO₄ conc. 73.5 grs | None | 75–80 | ½ | 80 | 1 | Slightly cloudy. |

The products were neutralized with NaOH, dried and ground, but the sodium sulphate was not separated from the organic material.

2 gram samples of each of the products were refluxed with 50 cc. of aqueous half-normal NaOH and H₂SO₄ solutions for 24 hours, after which it was found that the unused alkali or acid titrated back completely. In other words, there was absolutely no decomposition. The acid treatment made no change in the wetting properties of any of the products. The alkali treatment left unchanged the wetting times of the oleum and of the chlorsulphonic acid treated products A and B, but the wetting power of product C was increased by the treatment due to the precipation of impurities by the alkali.

Draves sinking tests at 30° C. gave the following sinking times in seconds

| Product | Untreated sample | | NaOH treated sample | | H₂SO₄ treated sample | |
|---|---|---|---|---|---|---|
| | 1 g./liter | 2 g./liter | 1 g./liter | 2 g./liter | 1 g./liter | 2 g./liter |
| A | 36.6 | 13.0 | 34.8 | 10.9 | 40.3 | 15.4 |
| B | 72.0 | 26.5 | 68.6 | 27.4 | 60.8 | 27.6 |
| C | 112.0 | 41.5 | 47.6 | 21.9 | 115.0 | 44.9 |

What I claim is:

1. Sulphonated condensation products of terpenes with alkyl phenols containing at least one alkyl group of 4 to 8 carbon atoms, said products in the form of their alkali metal salts being white to brown powders stable and soluble in water, dilute alkalies and acids and characterized by high wetting power in acid, neutral and alkaline solutions.

2. Sulphonated condensation products of terpenes with alkyl phenols containing at least one alkyl group of 4 to 6 carbon atoms, said products in the form of their alkali metal salts being white to brown powders stable and soluble in water, dilute alkalies and acids and characterized by high wetting power in acid, neutral and alkaline solutions.

3. Sulphonated condensation products of terpenes with alkyl phenols containing at least one amyl group, said products in the form of their alkali metal salts being white to brown powders stable and soluble in water, dilute alkalies and acids and characterized by high wetting power in acid, neutral and alkaline solutions.

4. Sulphonated condensation products of terpenes with alkyl phenols containing at least one butyl group, said products in the form of their alkali metal salts being white to brown powders stable and soluble in water, dilute alkalies and acids and characterized by high wetting power in acid, neutral and alkaline solutions.

5. The method of preparing wetting agents of improved wetting, scrubbing and emulsifying properties which comprises condensing with a terpene an alkyl phenol containing at least one alkyl group of 4 to 8 carbon atoms and sulphonating the condensation product.

6. The method of preparing wetting agents of improved wetting, scrubbing and emulsifying properties which comprises condensing with a terpene an alkyl phenol containing at least one amyl group and sulphonating the condensation product.

7. The method of preparing wetting agents of improved wetting, scrubbing and emulsifying properties which comprises condensing with a terpene an alkyl phenol containing at least one butyl group and sulphonating the condensation product.

ROBERT ZINK.